Patented Nov. 5, 1935

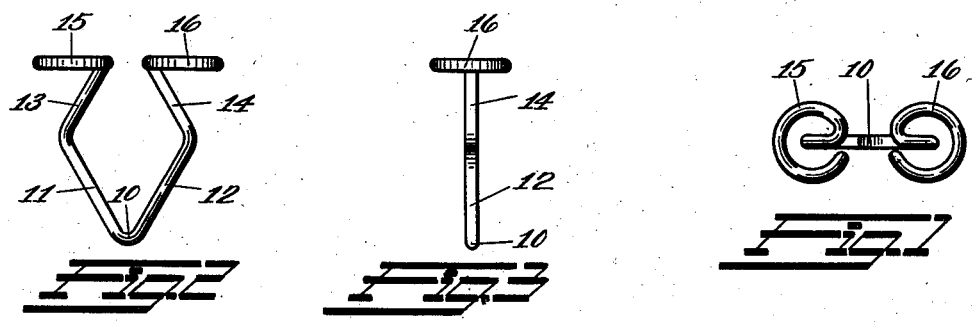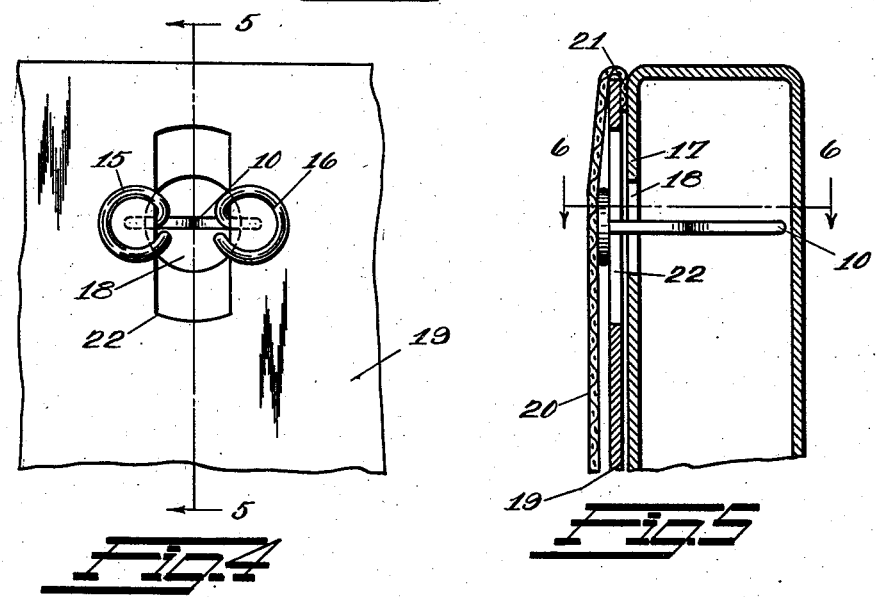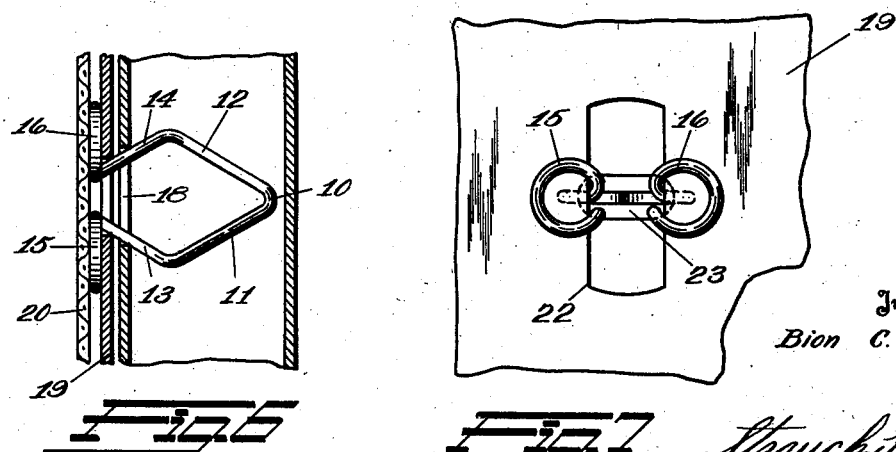

2,020,206

UNITED STATES PATENT OFFICE 2,020,206

SECURING TRIM PANELS

Bion C. Place, Detroit, Mich., assignor of one-half to George E. Gagnier, Detroit, Mich.

Original application August 28, 1930, Serial No. 478,411. Divided and this application August 25, 1931, Serial No. 559,306

3 Claims. (Cl. 45—138)

This invention relates to a method and arrangement for securing trim panels or the like to the supporting structure of an automobile or similar body by means of fasteners, particularly of the one-piece spring type, requiring only perforations or openings in the panel and supporting structure.

While this invention is intended for use particularly in securing trim or finish panels to the interior of automobile bodies, it is capable of being put to many other uses, especially in situations in which the rear of the supporting structure, to which material is to be attached by means of fasteners, is inaccessible for the application of nuts, cotter-pins, etc., and in which the material is to be yieldably held to said supporting structure by the fasteners with a continuously effective yielding pressure.

An object of the invention is to provide a novel arrangement for securing trim panels by a one-piece wire fastener of the spring type, formed by bending the wire between its ends to provide the spring holding portions of the fastener and by bending the ends thereof to form two separated head sections.

A further object of the invention is to provide a novel arrangement for securing trim panels by a one-piece fastener including a resilient shank and head sections, the overall transverse dimension of which in one direction is substantially greater than the overall transverse dimension in a direction at right angles to said first direction, so that the fastener may be applied to the body or foundation of a trim panel, after the covering of the outer face thereof has been applied thereto, by inserting said head in an elongated slot of regular form, and turning the fastener through an angle of 90 degrees after the head has been inserted in said slot, so that the major dimension of the head sections then extends across the slot.

A still further object of the invention is to secure trim panels by a one-piece spring fastener having a pair of head sections arranged in substantial spaced relation so as to permit relative movement of said sections and so as to widely distribute the yielding pressure on the material secured by the fastener over substantial areas at each side of the opening traversed by the shank of the fastener.

A still further object of the invention is to secure trim panels by a spring fastener, of the type that includes a yieldable shank, portions of which diverge from the point of the fastener, that first enters the opening or socket provided to receive it, in which the spring portions of the shank of the fastener flex with respect to said point, whereby a relatively great leverage is provided between the point at which flexure occurs and the point of bearing of the head or head sections of the fastener on the panel secured thereby.

Another object of the invention is to provide an arrangement for securing trim panels that does not require the exact alinement of the openings in the panel, through which the spring fasteners pass, with the perforations in the supporting structure that constitute the sockets for the fasteners.

Still another object is to attach trim panels to supporting structures of thicknesses that vary widely by means of identical fasteners designed to apply a yielding pressure on the panel, the yielding pressure being the result of the action of relatively long spring fastener arms on separated head sections of the fastener.

Further objects of the invention will appear as a description thereof proceeds with reference to the accompanying drawing in which—

Figures 1, 2, and 3 are respectively, plan, side and end elevations of a preferred form of fastener forming an essential part of this invention.

Figure 4 is a fragmentary side elevation of a trim panel for an automobile body held in position by one of said fasteners, the outer covering fabric being omitted to expose the fastener and the underlying construction.

Figure 5 is a sectional view taken in the plane indicated by the line 5—5 in Figure 4 with the fabric cover in position.

Figure 6 is a horizontal sectional view taken on the plane indicated by the line 6—6 of Figure 5.

Figure 7 is a view similar to Figure 4 but showing a modified arrangement.

Like reference characters indicate like parts throughout the several figures.

The fastener forming an important part of this invention is, preferably, formed from a single piece of wire bent to provide a resilient shank extending normally to a head, the latter consisting of two parts or sections, each part being formed from an end of the wire, the midportion of which is bent to form said shank of the fastener.

In order to form said fastener, the wire is bent at approximately its middle portion, providing a rounded nose portion 10. From said nose portion the wire is bowed outwardly providing divergently formed portions 11 and 12 that serve to guide the fastener in the opening of the supporting structure, which portions are hereinafter termed guiding portions. The portions of the bowed wire adjacent the guiding portions converge and provide holding portions 13 and 14. The ends of the wire are then bent in opposite directions into planes at right angles to the plane of the shank of the fastener formed in the manner just described, providing spaced head sections 15 and 16. Preferably, each of the head sections 15 and 16 is of circular form, although it will be readily understood that it may assume any desired configuration, the circular form being preferred because it is unnecessary, in making such sections, to bend the wire sharply at any point. While wire having a substantial thickness in the direction of flexure is preferred, the fastener may be formed of any strip of material capable of being effectively fabricated into the indicated form.

It will be observed that the head sections 15 and 16 are spaced relatively widely apart, and that the head section 15 is resiliently carried by the portions of the wire consisting of the guiding portion 11 and the holding portion 13, while the head section 16 is carried resiliently by the portion of the wire including the guiding portion 12 and the holding portion 14, and that, when said head sections are brought toward each other, the wire flexes at the return bend, that has resulted in the nose 10 before referred to.

A fastener is thus provided having relatively widely spaced head sections, each of which is supported by an arm flexing at a point that is spaced substantially inwardly from the head sections, thus providing a relatively long arm for the support of each of said sections. This arrangement results in a fastener having a high degree of resilience, and said arms, accordingly, serve to yieldingly press the material secured by the fastener against the supporting structure.

One manner of use of the fastener is illustrated in Figs. 4, 5 and 6 of the drawing, which shows the fastener applied for the purpose of securing a trim panel to the supporting structure of an automobile body. The supporting structure 17, may be part of the inside of the metallic frame work of an automobile door, for example, or any other part. In order to secure the trim panel thereto by means of the fastener of the present invention, it is only necessary to form openings 18 in the supporting structure. Such openings are formed, as will be readily understood, at intervals along the portions of the supporting structure opposite to the edges of the panels, that are to be applied thereto so that the fasteners are arranged at relatively closely spaced intervals around the periphery of the panels.

Trim panels, as generally used for finishing automobile bodies comprise a body 19 of fibrous or similar material and a fabric cover 20 for the outer or exposed surface of the body of the panel. Such fabric cover is wrapped around the edges of the body 19, as illustrated at 21, and it is desirable to be able to apply the fastener after the covering material has been applied thereto. This makes it necessary to apply the fastener from the rear or uncovered face of the panel body. To enable this to be done the body 19 is provided with elongated slots 22, having a length corresponding approximately to the major dimension of the head sections and of a width corresponding to the minor transverse dimension of the head of the fastener.

In applying a trim panel to the interior of an automobile body, by means of the fasteners of this application, the panel is provided with a fabric covering and with elongated openings 22 at regularly spaced intervals adjacent the periphery thereof. The improved fasteners are then inserted in the elongated slots 22 by moving the heads through said slots from the rear of the body of the panel, and after the heads are disposed between the fabric 20 and the outer face of the body 19 the fasteners are turned through 90 degrees to the position indicated in Fig. 4 of the drawing. In this position the head sections 15 and 16 bear upon substantial areas of the body of the panel at both sides of the slot 22.

After the fasteners have been assembled with respect to the panels as just described, the panels are applied to the supporting structure by bringing the noses 10 of each of the fasteners opposite the openings 18 in the supporting structure and applying pressure to force the shanks of the fasteners through said openings 18. The diameter of the openings 18 is less than the major transverse dimension of the shank of the fastener, and when such pressure is applied the guiding portions 11 and 12 as they move through the openings cause the head sections to approach each other, sufficient clearance being always provided between said head sections to permit the fastener to enter the openings 18. After the widest portion of the fastener has been sufficiently contracted to permit the passage of this portion of the shank of the fastener, the holding portions 13 and 14 spring apart engaging the side walls of the opening and serving to draw the material toward the supporting structure by means of a resilient wedging action. Inasmuch as in contracting the fastener, the flexure between the two arms of the shank of the fastener takes place at the point 10, it will be understood that the resilient pressure is applied to the panel by means of the relatively long spring arms extending from said point, as above pointed out.

In applying trim panels to the supporting structure of an automobile body it sometimes appears that the opening 18 in the supporting structure is not in exactly the desired position. If the opening should be slightly above or below its proper position, the fastener can be slid along the length of the elongated slot 22. If the opening 18 is slightly to one side of its correct position, the fastener of this invention will nevertheless serve to firmly hold the covering material in proper position because of the fact that it does not completely fill the opening and is capable of substantial lateral contraction that would automatically compensate for any improper positioning of the opening 18 to the degree that occurs in practice.

It is accordingly unnecessary, with the present invention, to provide a fastener that is free to move in all directions, and it is preferred to have the holding portions 13 and 14 when the fastener has been shifted to the proper position engage the side walls of the slot 22, and so that the fastener is held frictionally in position at all times.

It will be observed that the length of the holding portions 13 and 14 is many times the normal thickness of the supporting structure 17. With such arrangement the fastener will firmly hold the panel in position irrespective of such thickness. In actual practice it sometimes occurs that the fastener receiving openings must be located at points at which there are two or even three thicknesses of metal, provided generally by overlapping of adjacent sheet metal parts. The described fastener is capable of satisfactory use under such circumstances.

If desired, the modified arrangement shown in Figure 7 may be employed. In this form of the invention the frictional engagement of the holding portions 13 and 14 with the sides of the slot 22 and the wall of the opening 18 need not be relied upon to maintain the fastener in the position in which the head sections rest on the portions of the panel opposite said sides. To prevent all possibility of rotation of the fastener from its proper operative position to an extent necessary to permit disengagement of the head from the panel, the supporting structure 17 may be provided with an elongated slot 23 whose major dimension extends in a direction at right angles to the major dimensions of the slot 22. This arrangement precludes the turning of the fastener in the direction necessary to detach it from the panel after the assembly of the panel and the supporting structure has been effected.

In order to produce a fastener having the degree of stiffness essential to serve the purpose just described, I have found that it is desirable to avoid tempering the wire of which the fastener is made until after it has been bent into the completed form. I have found that tempered wire having the degree of stiffness necessary to use in practice for the above purpose, cannot be bent into the desired form without rupture of the wire, or at least without seriously weakening it at the point at which it is essential that it have the greatest strength. The fastener above mentioned accordingly is formed from soft wire. The wire is bent, while in this condition into the form of the fastener. This may be readily accomplished by machine. After the fastener has been formed, it is then tempered in any desired manner, giving it the necessary hardness and stiffness essential to the purposes which it must serve. The tempering may be brought about by heating the fastener that has been bent into a completed form to a white heat, and then submerging the fastener into a bath of oil of the kind that is used in such tempering operations.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

This application is a division of my application Serial No. 478,411 filed August 28, 1930.

What I claim and desire to secure by United States Letters Patent is:

1. In combination, a supporting structure having an elongated slot, a trim panel having an elongated slot extending in a direction transverse to the direction of said first named slot, and a fastener having an elongated head and a yielding shank arranged with its head extending across the slot in said panel and bearing on the portions adjacent thereto on opposite sides thereof, said spring fastener being held non-rotatively in said supporting structure by engagement of said shank in said first named slot.

2. In combination in an automobile or similar body, a metallic supporting structure having an elongated fastener receiving slot, a trim panel having an opening traversed by the shank of a spring stud fastener and within which said shank can turn, and a spring stud fastener having a head bearing on the panel adjacent said opening and a shank, having a major and a minor transverse dimension, disposed in said slot with its major dimension extending in the direction of the major dimension of the slot.

3. In combination, a covered automobile trim panel having a perforation in its body, a metallic supporting structure having a fastener receiving opening in approximate registry with said perforation, and a spring fastener yieldingly drawing the panel toward said structure, said fastener including a pair of separated head sections disposed between the covering material and body of the panel and arms disposed in acute angular relationship to said head sections and extending through said perforation and opening and a resilient V-shaped connection between said arms forming with said arms the shank of the fastener, said connection forcing said arms and head sections into contact with the walls of said perforation and said arms into contact with said opening thereby wedging the body and supporting structure together in the angles between said head sections and arms.

BION C. PLACE.